US005119526A

United States Patent [19]

Harstad et al.

[11] Patent Number: 5,119,526

[45] Date of Patent: Jun. 9, 1992

[54] GATE SUPPORT APPARATUS

[76] Inventors: Darrel W. Harstad, 7291 152nd La. NW., Ramsey, Minn. 55303; Gregory Anda, 11205 Hanson Blvd., Coon Rapids, Minn. 55433

[21] Appl. No.: 723,763

[22] Filed: Jul. 1, 1991

[51] Int. Cl.[5] ........................ A47B 91/00; B60B 33/00; E05F 7/06

[52] U.S. Cl. ........................................ 16/44; 49/396

[58] Field of Search .................... 16/44, 86.2; 49/396; 256/23

[56] References Cited

U.S. PATENT DOCUMENTS 1,409,468 3/1922 Reading, Jr. .......................... 49/396
1,944,185 1/1934 Langer .................................... 16/44
2,062,320 12/1936 Langer .................................... 16/44

FOREIGN PATENT DOCUMENTS 383872 11/1932 United Kingdom .................. 49/396

*Primary Examiner*—Robert L. Spruill
*Assistant Examiner*—Carmine Cuda
*Attorney, Agent, or Firm*—Leon Gilden

[57] ABSTRACT

An apparatus defining a carriage to arrange for securement to a bottom surface of a gate, wherein the carriage includes an upper tray assembly for receiving the gate, with a lower framework pivotally mounted relative to the upper framework for accommodating uneven ground terrain, with the lower framework mounting a wheel rotatably thereto, with the wheel's axle generally aligned with the lower framework.

7 Claims, 4 Drawing Sheets

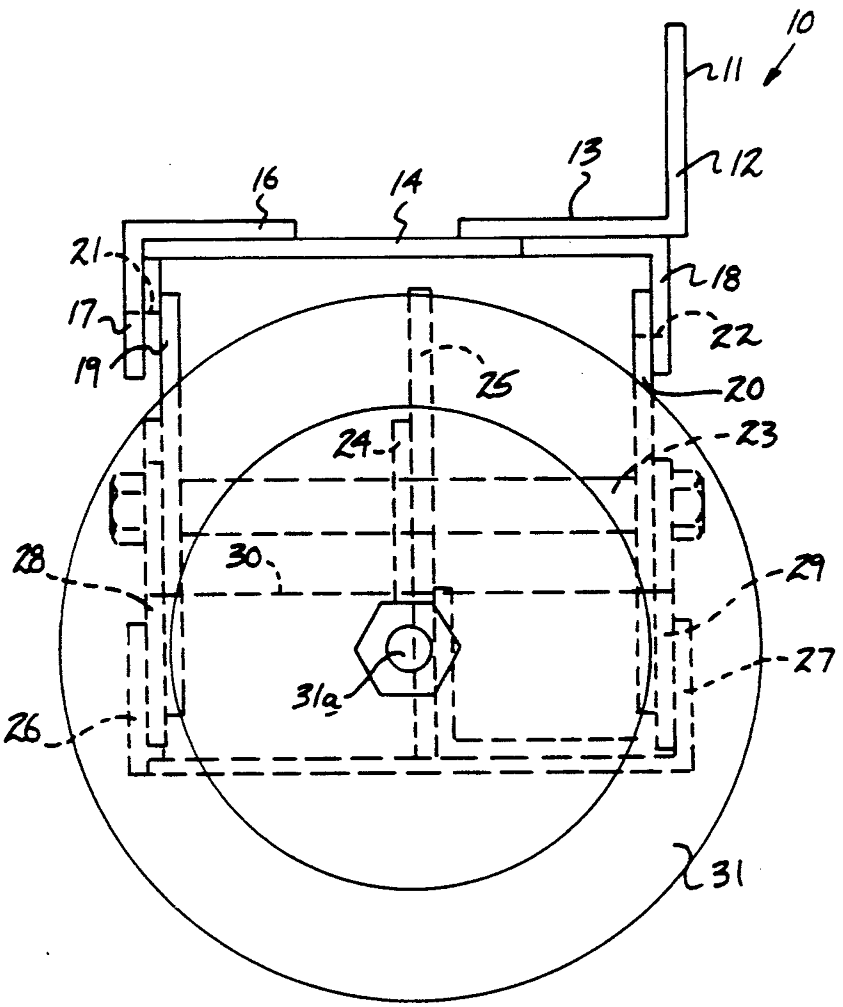
Fig 1
Fig 2
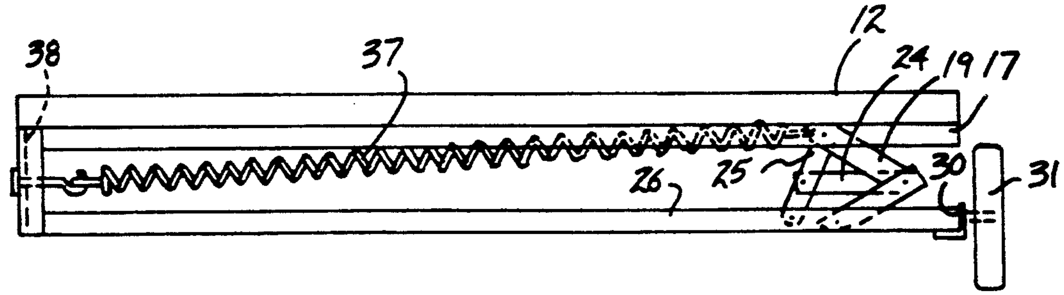

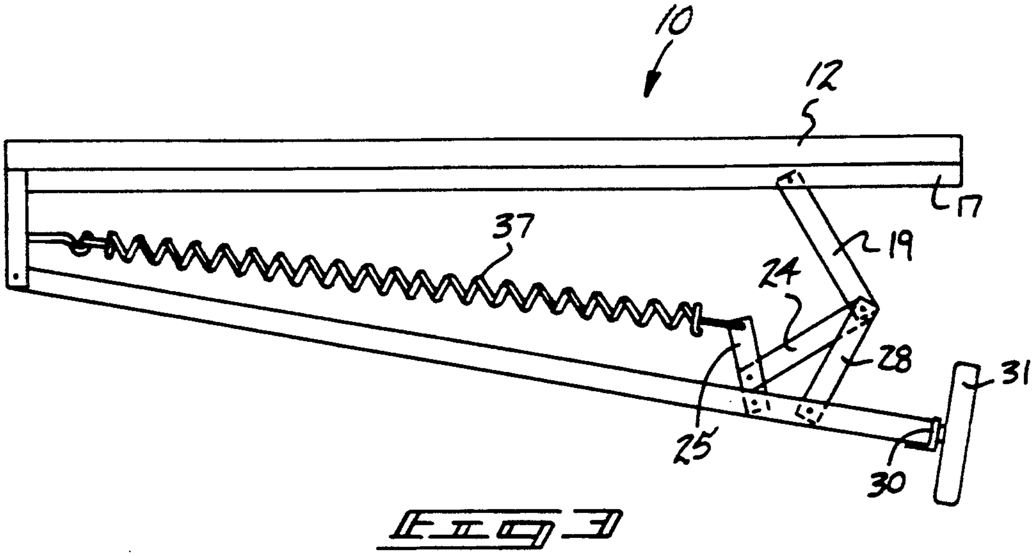
Fig 3
Fig 4
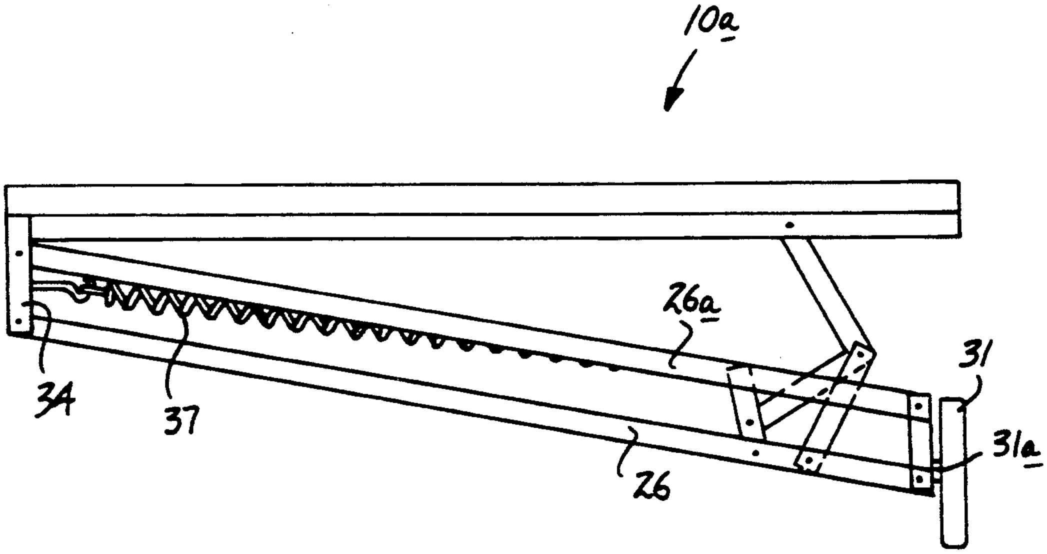

GATE SUPPORT APPARATUS

BACKGROUND OF THE INVENTION

1. Field of the invention

The field of invention relates to gate support apparatus, and more particularly pertains to a new and improved gate support apparatus wherein the same provides for pivotally mounted frameworks arranged relative to one another, wherein the lower framework mounts a wheel to permit the apparatus to accommodate various undulations in a ground surface under an associated gate mounted to the framework.

2. Description of the Prior Art

Typically, gates utilized relative to fences and the like are typically of a rather expansive structive and over a period of time will sag relative to supporting posts and hinges mounting the gate. To alleviate this problem, the prior art has positioned a wheel relative to the gate to permit the gate to roll over an underlying surface while the wheel affords support to the gate during its arc of swing. The situation arises frequently where an underlying ground support is not an equal distance at all points about the arc of swing, and accordingly the gate is permitted to place strain on the supporting structure of the gate when the wheel is spaced above such underlying surfaces. In an effort to overcome deficiencies of the prior art, the instant invention sets forth a plurality of frameworks defining a carriage, wherein a lower framework is pivotally mounted relative to an upper framework and the lower framework supporting a support wheel. Support for the gate is addressed by a spring member that typically biases the lower framework outwardly relative to the upper framework to thereby effect upwardly pressure to the gate and minimize suspended weight upon an associated gate's support structure.

Accordingly, it may be appreciated that there continues to be a need for a new and improved gate support apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of gate support apparatus now present in the prior art, the present invention grovides a gate support apparatus wherein the same utilizes pivoted frameworks biased apart relative to one another, with a lower framework mounting a support wheel to rotatably traverse and underlying ground support relative in a gate mounted upon the upper framework. As such, the general purpose of the present invention, which will be described subsequently in greater detail, is to provide a new and improved gate support apparatus which has all the advantages of the prior art gate support apparatus and none of the disadvantages.

To attain this, the present invention provides an apparatus defining a carriage to arrange for securementi to a bottom surface of a gate, wherein the carriage includes an upper tray assembly for receiving the gate, with a lower framework pivotally mounted relative to the upper framework for accommodating uneven ground terrain, with the lower framework mounting a wheel rotatably thereto, with the wheel's axle generally aligned with the lower framework.

My invention resides not in any one of these features per se, but rather in the perticular combination of all of them herein disclosed and claimed and it is distinguished from the prior art in this particular combination of all of its structures for the functions specified.

There has thus been outlined, rather broadly, the more important features of the invention in order that the detailed description thereof the follows may be better understood, and in order that the present contribution to the art may be better appreciated. There are, of course, additional features of the invention that will be described hereinafter and which will form the subject matter of the claims appended hereto. There skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved gate support apparatus which has all the advantages of the prior art gate support apparatus and none of the disadvantages.

It is another object of the present invention to provide a new and improved gate support apparatus which may be easily and efficiently manufactured and marketed.

It is a further object of the present invention to provide a new and improved gate support apparatus which is of a durable and reliable construction.

An even further object of the present invention is to provide a new and improved gate support apparatus which is susceptible of a low cost of manufacture with regard to both materials and labor, and which accordingly is then susceptible of low prices of sale to the consuming public, thereby making such gate support apparatus economically available to the buying public. Still yet another object of the present invention is to provide a new and improved gate support apparatus which provides in the apparatuses and methods of the prior art some of the advantages thereof, wh ile simultaneously overcoming some of th e disadvantages normally associated therewith.

There together with other objects of the invention, along with the various features of novelty which characterize the invention, are pointed out with particularity in the claims annexed to and forming a part of this disclosure. For a better understanding of the invention, its operating advantages and the specific objects attained by its uses; reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic and view of the instant invention.

FIG. 2 is an orthographic side view of the instant invention.

FIG. 3 is an orthographic side view of the instant invention, with the upper and lower frameworks in a spaced relationship biased apart by a medially oriented spring.

FIG. 4 is an orthographic side view of a modification of the invention utilizing the lower framework formed as a rectilinear configuration.

DESCRIPTION OF THE PREFERRED EMBODIMENT

Figure 5:
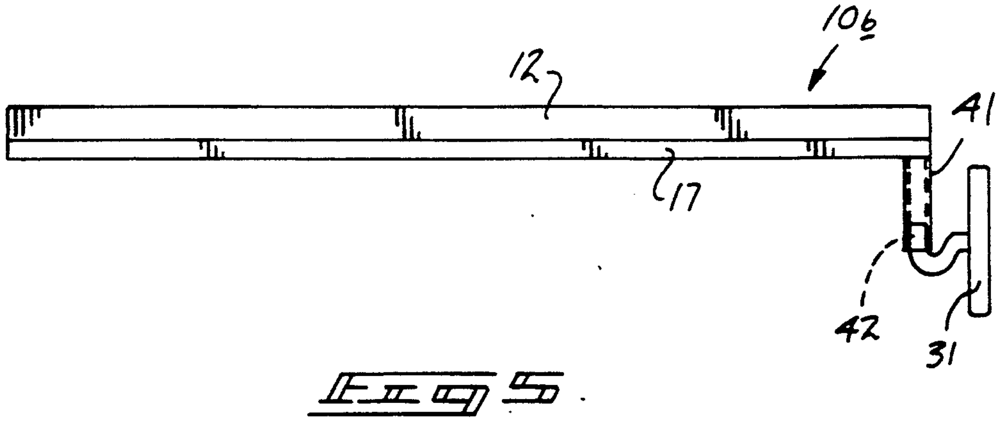
FIG. 5 is an orthographic side view of a further modified aspect of the invention.
Figure 6:
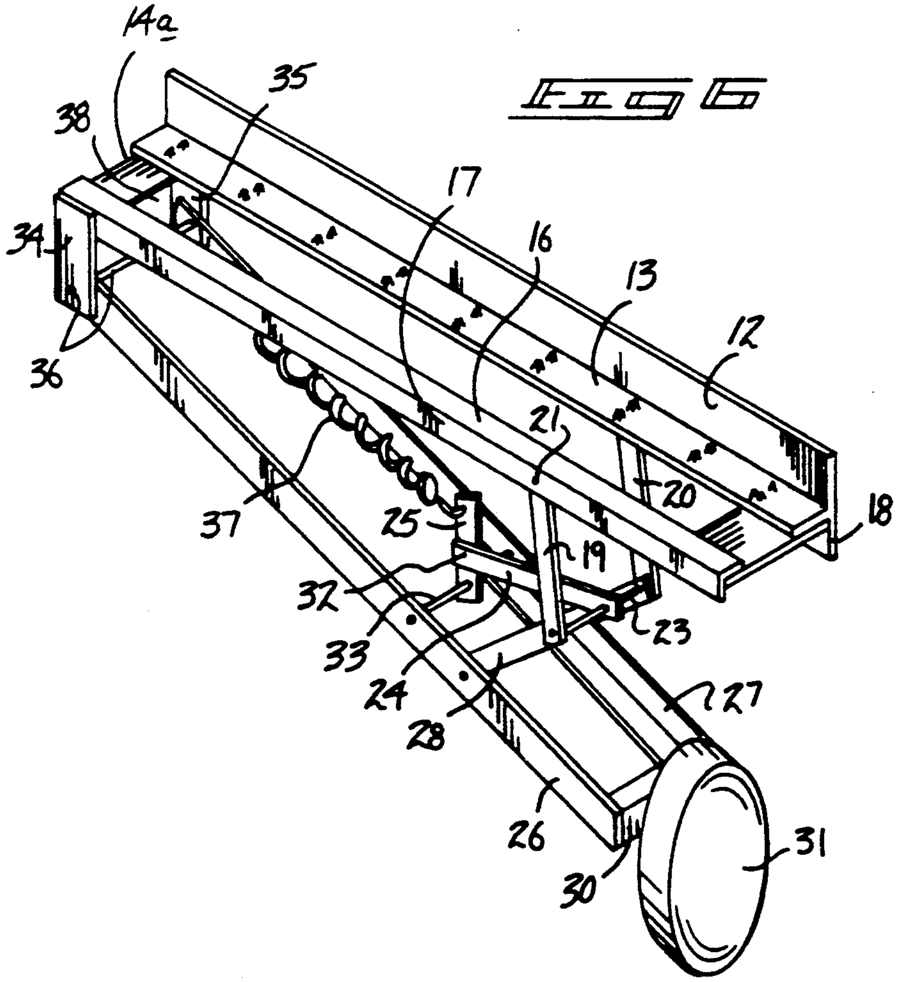
FIG. 6 is an isometric illustration of the invention.
Figure 7:
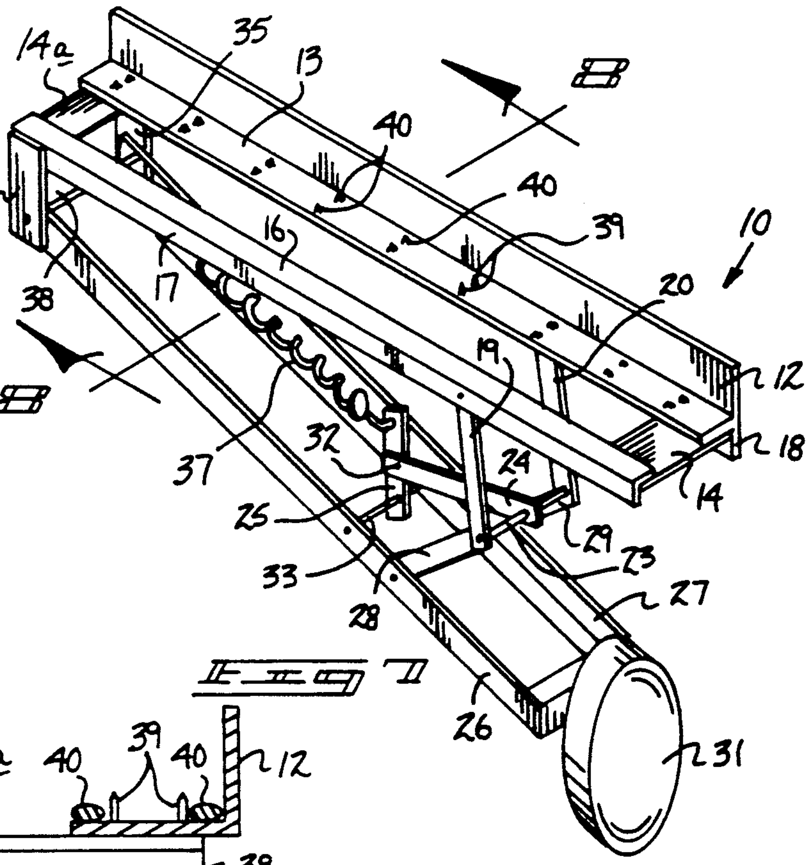
FIG. 7 is an isometric illustration of the invention illustrating the use of adhesive capsules.
Figure 8:
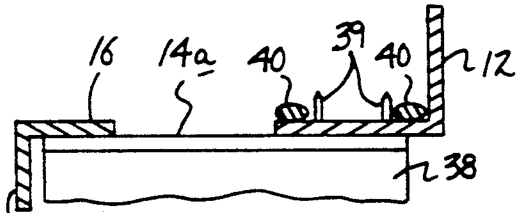
FIG. 8 is an orthographic view, taken along the lines 8—8 of FIG. 7 in the direction indicated by the arrows.
Figure 9:
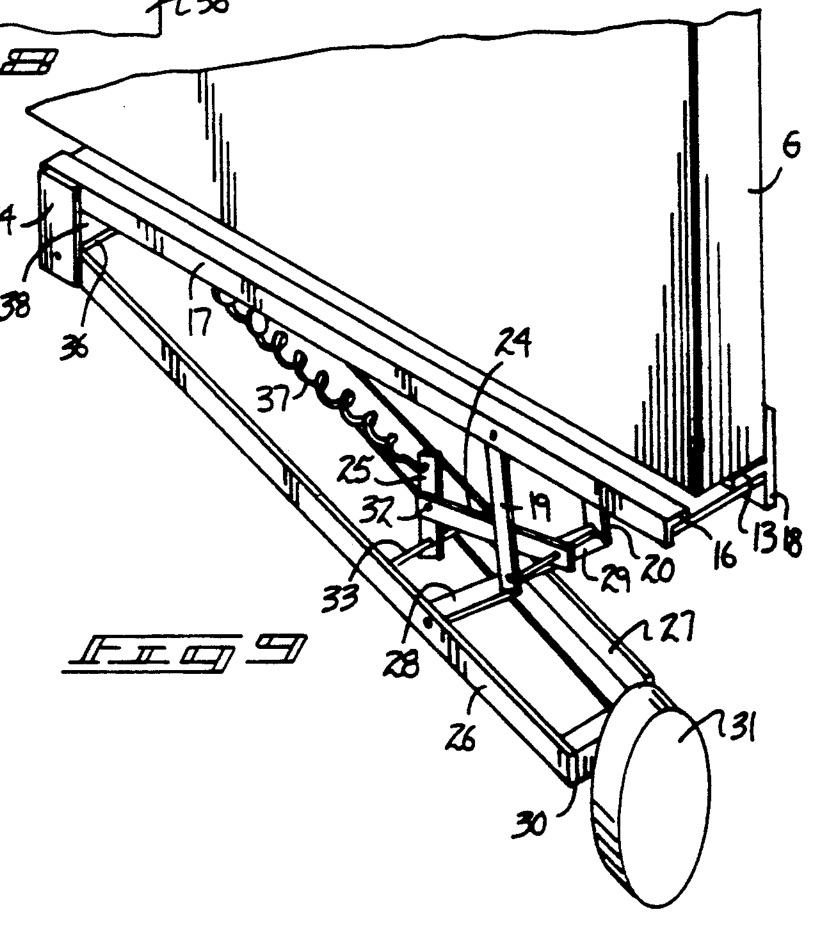
FIG. 9 is an isometric illustration of the invention mounting a gate structure thereon.

With reference now to the drawings, and in particular to FIGS. 1 to 9 thereof, a new and improved gate support apparatus embodying the principles and concepts of the present invention and generally designated by the reference numeral 10 will be described.

More specifically, the gate support apparatus 10 of the instant invention essentially comprises an upper carriage pivotally mounted relative to a lower carriage, wherein the upper carriage includes an "L" shaped support member parallel to a second support flange 16 that includes a downwardly extending first mounting flange 17 coextensive with the second support flange 16. The "L" shaped support member 11 includes an abutment flange 12 projecting orthogonally above a first support flange 13. The first support flange 13 and the second support flange 16 are substantially coplanar. A second mounting flange 18 orthogonally mounted to a bottom surface of the first support flange 13 is arranged parallel to and spaced from the first mounting flange 17. A forward and rear bridge plate 14 and 14*a* respectively are orthogonally mounted to respective forward and rear terminal ends of the first and second support flanges 13 and 16. Adjacent forward portions of the respective first and second mounting flanges 17 and 18 are pivoted respective first and second mounting flange links 19 and 20 respectively at upper terminal ends of the first and second mounting flange links through respective first and second pivot axles 21 and 22 that are coaxially aligned relative to one another. A central axle 23 is orthogonally directed through lower terminal ends of the first and second mounting flange links 19 and 20, wherein a medial link 24 is pivotally mounted at a forward terminal end of the medial link medially of the central axle 23. A rear end of the central axle 23 is pivotally mounted to a rear link 25 between an upper and lower terminal end of the rear link, with a lower terminal end of the rear link pivotally mounted about a rear link second pivot axle 33 that is orthogonally directed through spaced parallel lower first and second legs 26 and 27 respectively of the lower carriage. A rear link first pivot axle 32 pivotally connects the rear terminal end of the medial link 24 to the rear link 25 adjacent an upper terminal end of the rear link 25 mounting a forward end of a spring 37, wherein the rear end of the spring 37 is fixedly mounted medially of a rear plate 38 that is orthogonally oriented to a rear edge portion of the rear bridge plate 14*a* and the first and second support flanges 13 and 16. Lower first and second leg links 28 and 29 are pivotally mounted at their upper terminal ends to the central axle 23 adjacent the first and second mounting flange links 19 and 20. Lower terminal ends of the first leg links 28 and 29 are pivotally mounted to the lower first legs 26 and 27 forwardly of the rear link second pivot axle 33. A wheel support flange 30 is orthogonally mounted to a forward terminal end of the lower first and second legs 26 and 27 rotatably mounting a cylindrical wheel member 31 axially thereof by a wheel axle 31*a* . A right and left rear positioning plate 34 and 35 are integrally mounted in an orthogonal relationship relative to the rear bridge plate 14*a* and extend downwardly therefrom, with a positioning plate axle 36 orthogonally directed adjacent lower terminal ends of the right and rear positioning plates 34 and 35 pivotally mounting rear end portions of the lower first and second legs 26 and 27. In this manner, the upper carriage is typically biased away from the lower carriage, as illustrated, whereupon support of a gate "G" provides pressure applied to the gate minimizing strain on support hardware (not shown) relative to the gate.

If required, a matrix of projecting spikes 39 are mounted coextensively to a top surface of the first support flange 13 and may further include rupturable adhesive packets 40 positioned adjacent the spikes 39 to enhance engagement of the gate "G" relative to the upper carriage.

FIG. 4 illustrates a modified construction of the invention wherein the lower carriage utilizes a rectilinear framework utilizing upper leg, such as 26*a*, to provide enhanced support in use. Further, a modification 10*b*, as illustrated in FIG. 5, may incorporate a socket 41 mounted medially of and orthogonally relative to a forward bridge plate mounting a spring therewithin to bias a socket rod 41 outwardly thereof that supports the cylindrical member 31.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A gate support apparatus, comprising, an elongate upper carriage, including an upper carriage rear end portion, wherein the upper carriage rear end portion pivotally mounts a lower carriage, the lower carriage spaced below the upper carriage and coextensive therewith, wherein a forward end of the lower carriage rotatably mounts a wheel orthogonally oriented relative to the lower carriage, and biasing means to bias the upper carriage in a spaced relationship relative to the lower carriage.

2. An apparatus as set forth in claim 1 wherein the upper carriage includes a first support flange spaced from, parallel to, and coplanar with a second support flange, and a forward bridge plate spaced from a rear bridge plate, wherein the forward and rear bridge plates are orthogonally oriented relative to forward and rear ends of the first and second support flanges, and a first mounting flange orthogonally and coextensively mounted to the second support flange, and a second mounting flange orthogonally mounted below the first support flange, wherein the first and second mounting flanges are in a parallel coextensive relationship relative to one another, and rear right and left respective positioning plates mounted orthogonally to the first and second mounting flanges at a rear end portion of the first and second mounting flanges to define the upper carriage rear portion, and the rear right and left positioning plates include a positioning plate axle orthogonally directed through the rear right and left positioning plates at lower terminal ends of the right and left positioning plates, with the lower carriage pivotally mounted to the positioning plate axle, and a wheel support flange orthogonally mounted to the lower first and second legs at a forward end of the first and second legs to define the lower carriage forward portion, with the cylindrical wheel member orthogonally directed through the wheel support flange.

3. An apparatus as set forth in claim 2 wherein the biasing means includes a first mounting flange link pivotally mounted at an upper terminal end of the first mounting flange link to the first mounting flange, and a second mounting flange link coextensive with a parallel to the first mounting flange link pivotally mounted at an upper terminal end of the second mounting flange link to the second mounting flange, and a first mounting flange lower terminal end, and a second mounting flange lower terminal end include a central axle orthogonally directed therethrough, and a medial link, the medial link including a medial link forward end, wherein the medial link forward end is pivotally mounted medially of the central axle, and a medial link rear terminal end includes a rear link first pivot axle, and a rear link, and the rear link first pivot axle directed orthogonally through the rear link between an upper and lower rear link end portion, and the rear link lower end portion including a rear link second pivot axle orthogonally directed therethrough, wherein the rear link second pivot axle is orthogonally directed through the lower first and second legs parallel to and rearwardly of the central axle and rearwardly of the lower first leg link and the lower second leg link.

4. An apparatus as set forth in claim 3 wherein the biasing means further includes a spring member, the spring member including a spring member forward end, the spring member forward end mounted to the rear link spaced above the rear link first pivot axle, and the spring member includes a spring member rear end, the spring member rear end is mounted medially of a rear plate, the rear plate fixedly and orthogonally mounted between the rear right and left positioning plates.

5. An apparatus as set forth in claim 4 wherein the first support flange includes a matrix of projecting spikes mounted thereon.

6. An apparatus as set forth in claim 5 wherein at least one of said projecting spikes includes a rupturable adhesive packet positioned adjacent the at least one of projecting spike for enhanced securement of a bottom portion of a gate when positioned upon the first support flange.

7. An apparatus as set forth in claim 6 wherein the first support flange includes an abutment flange directed orthogonally and upwardly relative to the first support flange to provide an abutment surface for the gate positioned upon the first support flange.

* * * * *